(12) United States Patent
Liu et al.

(10) Patent No.: US 11,985,263 B1
(45) Date of Patent: May 14, 2024

(54) ASYNCHRONOUS AND CONCURRENT TRANSACTION PROCESSING METHOD WITH HIGH-PERFORMANCE ORIENTED TO PERMISSIONED BLOCKCHAIN

(71) Applicant: Tianjin University, Tianjin (CN)

(72) Inventors: Xiulong Liu, Tianjin (CN); Baochao Chen, Tianjin (CN); Sheng Qin, Tianjin (CN); Keqiu Li, Tianjin (CN)

(73) Assignee: TIANJIN UNIVERSITY, Tianjin (CN)

( * ) Notice: Subject to any disclaimer, the term of this patent is extended or adjusted under 35 U.S.C. 154(b) by 0 days.

(21) Appl. No.: 18/402,384

(22) Filed: Jan. 2, 2024

(30) Foreign Application Priority Data

May 11, 2023 (CN) .......................... 202310524558.9

(51) Int. Cl.
*H04L 9/32* (2006.01)
*H04L 9/00* (2022.01)

(52) U.S. Cl.
CPC .............. *H04L 9/50* (2022.05); *H04L 9/3236* (2013.01)

(58) Field of Classification Search
CPC ............................... H04L 9/50; H04L 9/3236
USPC ....................................................... 713/168
See application file for complete search history.

(56) References Cited

U.S. PATENT DOCUMENTS

2021/0326074 A1* 10/2021 Tian ...................... G06F 3/0611
2022/0414088 A1* 12/2022 Krishnan .................. H04L 9/50

OTHER PUBLICATIONS

Tianjin University (Applicant), Supplemental Amendment for CN202310524558.9, w/ (allowed) replacement claims, Sep. 11, 2023.
CNIPA, Notification to grant patent right for invention in CN202310524558.9, Sep. 22, 2023.

* cited by examiner

*Primary Examiner* — Khoi V Le
(74) *Attorney, Agent, or Firm* — Zhigang Ma (57) ABSTRACT

An asynchronous and concurrent transaction processing method with high-performance oriented to a permissioned blockchain belongs to the field of blockchain technologies. The method designs two processing schemes for abort transactions, namely, additional submission of unnecessary abort transactions that are serializable and delayed centralized processing of long-conflict-chain transaction aggregation. In order to avoid the instability of system transaction processing performance caused by single point failure, the method designs a multi-node round robin consensus strategy. In addition, an inter-node auxiliary concurrency acceleration scheme is designed, which can improve the transaction performance of the whole of the system only by upgrading some of node devices in the system.

4 Claims, 7 Drawing Sheets

| State | Previous write operation | Minimum written-transaction serial number | Minimum read-transaction serial number |
|---|---|---|---|
| A | 1 | 1001 | 131 |
| B | 2 | 208 | 138 |
| C | 3 | 509 | 97 |
| D | 4 | 911 | 188 |
| ...... | | | |

| Being dependent | Block height | Dependent |
|---|---|---|
| 1001 | -- | 131 |
| 208 | -- | 138 |
| 509 | -- | 97 |
| 911 | -- | 188 |
| ...... | | |
| 301 | 2 | 199 |
| 233 | 3 | 178 |
| 123 | 4 | 485 |
| ...... | | |

Intra-block dependence (rows 1–4); Inter-block dependence (rows 5–7).

ASYNCHRONOUS AND CONCURRENT TRANSACTION PROCESSING METHOD WITH HIGH-PERFORMANCE ORIENTED TO PERMISSIONED BLOCKCHAIN

TECHNICAL FIELD

The present disclosure relates to the field of blockchain technologies, and particularly to an asynchronous and concurrent transaction processing method with high-performance oriented to a permissioned blockchain.

BACKGROUND

A blockchain system is essentially a decentralized distributed database management system based on cryptography and a chain storage structure. What the blockchain system has in common with a traditional distributed database management system is that each node in the corresponding system has a copy of the same data. However, a traditional distributed database can only be managed centrally by the same interest organization, because the premise of the traditional distributed databases to ensure service reliability is that all nodes in the traditional distributed database management system can trust each other. Therefore, the blockchain system is different from the traditional distributed database management system in that the blockchain system can run on a cluster of nodes that do not trust each other. Blockchain was originally designed for Bitcoin cryptocurrency. Since the advent of Bitcoin, cryptocurrency and a blockchain technology have aroused great interest in academia and industry.

For the related research on the concurrent processing of blockchain transactions, the early research work is divided into two types, namely, the concurrent processing of virtual currency transactions and the concurrent processing of smart contracts, because the early research work mainly focused on an Ethereum system. For a public chain system such as the Ethereum system, the virtual currency transactions are indispensable core business thereof, therefore, the Ethereum system has own independent design and implementation with respect to the virtual currency transactions, and the implementation of the virtual currency transactions is very different from the implementation of the smart contracts. For an Ethereum system based on account model, it has a natural disadvantage compared with an unspent transaction output UTXO model of Bitcoin in terms of the virtual currency transactions, because virtual currency transactions based on the UTXO model naturally support concurrency; however, the Ethereum has to make concurrency sacrifice in order to support the smart contracts. Even so, there is little research on the concurrency of the virtual currency transactions in the Ethereum. In addition, because the some smart contracts involve the transfer of virtual currency, the concurrency of the virtual currency transactions in the Ethereum is usually mentioned as a special case in the concurrency of the smart contracts.

The Ethereum has designed a special virtual machine, i.e., ethereum virtual machine (EVM) for the smart contracts. At the beginning of the design of the EVM, the EVM has two main purposes: 1) it can optimize an instruction set for special computing in the blockchain; 2) it can unify the coding standard to avoid using a special syntax of other programming languages to affect the Ethereum system itself. Therefore, there are also some research works to improve the performance of concurrent processing for blockchain transactions from the EVM.

It is precisely because of these factors that the concept of concurrency of the smart contracts appeared earlier than concurrency processing of the blockchain transactions in previous research work, but the former is only a branch of the latter in essence. It is worth mentioning that although the starting point of the design of the EVM is very good, it has not become the specification of the smart contracts of blockchain. Except for the Ethereum itself and systems modified based on a source code of the Ethereum, almost no other blockchain system uses the EVM. Because of the rapid development of modern programming languages, it is difficult for EVM to show obvious advantages, and with the increase of application scenarios of the smart contracts, the EVM needs to be continuously upgraded for supporting the application scenarios, which may limit the development of the smart contracts.

In some recent research work, the research focus of a concurrent processing technology for blockchain transactions has gradually shifted to a permissioned blockchain. In the permissioned blockchain, a virtual currency is not as important as a public chain, and it is as special as an ordinary transaction, therefore, it is usually realized through the smart contracts. In the Ethereum system, since a main bottleneck of the Ethereum system is proof of work (PoW) consensus, the efficiency of concurrent transaction processing is not so important. As such, even though the efficiency of transaction processing itself is higher, the throughput of the Ethereum system is still very limited. However, with the wide application of the permissioned blockchain and the uninterrupted improvement of consensus efficiency, this situation has begun to change, and the concurrent processing technology for transactions has become particularly important, so a large number of high-level research results have begun to appear.

According to architecture models, the related research work of concurrent processing for blockchain transactions is classified into two architecture models: an order-execute-validate (OEV) architecture and an execute-order-validate (EOV) architecture. The OEV architecture is used to order and package original transactions that have not been executed, and then execute the transactions to obtain transaction outputs, while the EOV architecture is used for serializable ordering and packaging transactions according to transaction outputs obtained after executing of the transactions. Thanks to the great success of hyperledger fabric in industry, the hyperledger fabric has become a unified experimental platform for research work of most EOV architectures, which makes the EOV architecture develop rapidly. However, because the EOV architecture only pays attention to the retention of transaction processing results, the means of performance improvement is very single. Moreover, the EOV architecture makes the ordering of nodes become the bottle neck of the blockchain system, as such, the performance of the blockchain system is seriously restricted. Although the OEV architecture is more flexible, the performance of the mainstream concurrency control technology it uses is affected by the lock overhead and insufficient concurrency. In view of this, the present disclosure provides an asynchronous and concurrent transaction processing method with high-performance oriented to permissioned blockchain.

SUMMARY

The purpose of the present disclosure is to provide an asynchronous and concurrent transaction processing method with high-performance oriented to a permissioned blockchain to solve the problems raised in the related art. The deterministic concurrency control technology introduced by the present disclosure can realize complete concurrency without using locks, and the present disclosure designs two processing schemes for abort transactions. The present disclosure also designs a multi-node round-robin consensus technology to improve the reliability of consensus, thereby improving the stability of transaction processing performance. The present disclosure also designs an inter-node auxiliary concurrency technology, which reduces the equipment cost needed to improve the system performance.

In order to achieve the above purpose, the present disclosure adopts the following technical scheme.

The present disclosure provides an asynchronous and concurrent transaction processing method with high-performance oriented to a permissioned blockchain, which includes steps S1-S10.

In S1, when a new node is added to a blockchain system, all nodes in the blockchain system need to be notified. Each new node needs to build a local hash ring, and other nodes also need to update their local hash rings. This is achieved by a consistent hash algorithm. Each node determines transactions that it can handle according to its position in the hash ring. When a node joins or exits, only neighboring nodes of this node will be affected, and the neighboring nodes need to update a transaction set that the neighboring nodes can handle. Based on this, each node in a network constructs a local hash ring, and positions of all nodes in the network on the hash ring are determined according to a node identifier of each of the all nodes. When a new node is added, the nodes in the network update the hash ring and use the new node to construct a complete hash ring.

In S2, each node needs to construct a transaction pool locally to temporarily store a transaction set that needs to be processed, and needs to synchronize with other nodes. Each node needs to set up a time wheel timer for all transactions, which can efficiently monitor several transactions. Based on this, each node uses a synchronization clock to synchronize an equipment time, and each node maintains the time-wheel timer with a time complexity of O(n). A delay of a transaction is monitored according to a timestamp of the transaction. In response to the delay reaching a preset threshold, a version number of the transaction is increased by 1, and a node is redistributed for processing the transaction through re-hashing. Because a transaction time is used and the time between nodes is synchronized by the synchronization clock, the transaction processing is consistent, which can prevent the transaction delay from increasing indefinitely due to overheating of nodes and prevent malicious nodes from not processing some transactions all the time.

In S3, based on a round robin mechanism of blockchain consensus, each node generates blocks in turn. In order to improve the reliability of consensus, multiple nodes generate blocks asynchronously and initiate consensus in a round, and finally confirm the blocks at the end of the round.

In S4, in a situation that the blocks are generated by the nodes asynchronously in the round, the blocks generated by different transaction sets are obtained by using a consistent hash algorithm, so that the overlapping of transactions between blocks can be prevented, and heights of the blocks is managed through a view server. Before a node sends a consensus, it first sends a consensus request to the view server, then the view server signs a view code, and then the node sends a block containing the view code to the network for consensus.

In S5, when the nodes in the network reach a consensus on the generated blocks, that is, a total number of the nodes is N, a total number of Byzantine nodes is f, N≥3f+1, and more than 2f+1 acknowledgments are received by the nodes, thus it is determined that the nodes have reached the consensus on the blocks, then an order of transactions in the blocks is determined;

In S6, in a situation that the consensus is completed on the blocks, each node will execute the blocks, and broadcast a hash of each of the executed blocks to the network, and wait for enough confirmation messages. A deterministic concurrency control technology introduced by the present disclosure is used for transaction concurrency processing in an execution process of the blocks. Firstly, a minimum transaction serial number of each of states is obtained concurrently, each state corresponds to a variable in a smart contract, and all transactions that need to be processed are realized through the smart contract. When obtaining the minimum transaction serial number of each of the states concurrently, it is realized by executing the transactions concurrently, and the minimum transaction serial number needs to be obtained respectively for a read operation and a write operation of each state. For example, a transaction 3 needs to read a state a, if a minimum transaction serial number of the state a does not exist yet, 3 will be updated to be the minimum transaction serial number read by the state a, and the minimum transaction serial number will be updated if there is a smaller value. Finally, a minimum read-transaction serial number and a minimum written-transaction serial number of each of the states can be obtained respectively.

In S7, in a process and submission stage of the transactions, the transactions in the blocks are started to be processed concurrently, in an independent processing logic of each transaction of the transactions, a reading set and a writing set of the transaction are traversed, and compared with the minimum read-transaction serial number and the minimum written-transaction serial number of each of the states obtained in S6, to thereby determine whether to commit or abort the transactions to thereby obtain an abort transaction of the transactions.

In S8, a delayed centralized processing scheme is designed for the abort transaction obtained in S7, and a deterministic step-by-step delayed block generation method performed on the abort transaction according to a ratio of a length of a data conflict chain of the abort transaction to a size of a block of the abort transaction, to provide a buffer effect for the coordination of consensus modules.

In S9, for a complete block execution process in S6 and S7, an inter-node auxiliary concurrency acceleration scheme is designed.

In S10, for a serial execution process in the delayed centralized processing scheme, an inter-node auxiliary concurrency acceleration scheme based on directed acyclic graph (DAG) dependency graph is designed.

In an embodiment, in S4, in a situation that there is an interval in view codes acquired by one node of the nodes, the one node waits for a period of t, which is shorter than the consensus interval of one round. Because a practical byzantine fault tolerance (PBFT) consensus needs three rounds of communication, the t is about one third of the consensus interval. In response to the one node initiating the consensus having not received information within the period of t, it is considered that a node acquiring a smaller view code than that acquired by the one node has not initiated consensus normally. At this time, the one node initiating the consensus makes synchronization information indicating aborting in advance be contained in the consensus request of the one node, and the nodes reach a consensus on a block whose interval is aborted in advance, which can reduce a consensus waiting time. In response to the one node initiating the consensus having not received the information due to network failure thereof and other nodes having completed a consensus request with the smaller view code, the one node initiating the consensus is recognized by each of the other nodes having completed the consensus request with the smaller view code, the consensus initiated by the one node is aborted in advance, which can also reduce the consensus waiting time.

In an embodiment, S7 further includes:
1) in response to the minimum written-transaction serial number corresponding to a state in the writing set of the transaction being less than a serial number of the transaction, aborting the transaction;
2) in a situation that the transaction satisfies one of the following two situations, or the transaction satisfies none of the following two situations, submitting the transaction directly:
   (1) the minimum read-transaction serial number corresponding to a state in the writing set of the transaction is less than the serial number of the transaction;
   (2) the minimum written-transaction serial number corresponding to a state in the reading set of the transaction is less than the serial number of the transaction;
3) for the transaction that satisfies the two conditions in 2) at the same time, obtaining all related transactions of the transaction, where the all related transactions originate from in a minimum read-transaction serial number set or a minimum written-transaction serial number set of the states, the all related transactions of the transaction satisfy one of the following two conditions:
   (1) a serial number of each of the all related transactions is greater than the serial number of the transaction, and the minimum written-transaction serial number corresponding to a state in the reading set of the transaction is greater than the serial number of the transaction;
   (2) a serial number of each of the all related transactions is less than the serial number of the transaction, and the minimum read-transaction serial number corresponding to a state in the writing set of the transaction is less than the serial number of the transaction;
4) in an additional commit stage, processing transactions satisfying the two conditions in 2) concurrently; and in response to all related transactions obtained in 3) of each of the transactions satisfying the two conditions in 2) having been aborted in advance, committing each of the transactions satisfying the two conditions in 2) at the additional commit stage.

In an embodiment, the delay centralized processing scheme in S8 specifically includes:
in response to the length of the data conflict chain of the abort transaction being less than 5% of the size of the block of the abort transaction, putting the abort transaction back into a transaction pool, and submitting the abort transaction after a target number of blocks from the block of the abort transaction when the length of the data conflict chain of the abort transaction does not continue to grow;
in response to the length of the data conflict chain of the abort transaction being greater than 5% of the size of the block of the abort transaction, starting a block generation process after different number of blocks from the block of the abort transaction, specifically including:

(1) in response to the length of the data conflict chain of the abort transaction being greater than 5% of the size of the block of the abort transaction and less than or equal to 20% of the size of the block of the abort transaction, starting the block generation process from a fifth block after the block of the abort transaction;
(2) in response to the length of the data conflict chain of the abort transaction being greater than 20% of the size of the block of the abort transaction and less than or equal to 40% of the of the abort transaction, starting the block generation process from a tenth block after the block of the abort transaction;
(3) in response to the length of the data conflict chain of the abort transaction being greater than 40% of the size of the block of the abort transaction and less than or equal to 60% of the size of the block of the abort transaction, starting the block generation process from a fifteenth block after the block of the abort transaction;
(4) in response to the length of the data conflict chain of the abort transaction being greater than 60% of the size of the block of the abort transaction, starting the block generation process from a twentieth block after the block of the abort transaction;
in response to the length of the data conflict chain of the abort transaction being accumulated in multiple blocks, continuing the block generation process backward according to a proportional change.

Through this centralized processing method, the sensitivity of the system to conflict handling can be reduced and other transactions can be avoided from being unnecessarily affected. For a certain number of batch write operation transactions, the total processing time will increase linearly with the increase of the number of the transactions, which is easily accepted by users. In order to simplify the problem handling mode, the method in the present disclosure does not control the distribution of abort transactions in blocks, but simply ordering is performed according to a length of a data conflict chain and the earliest transaction abort height, and then blocks are generated one by one. The present disclosure uses insertion ordering here, because the insertion ordering is a stable ordering algorithm, as such, there is no need to consider the special handling when the transaction abort height is the same as the conflict chain length.

In an embodiment, the inter-node auxiliary concurrency acceleration scheme in S9 specifically includes:

S9.1, executing, by a high-performance node, which is one node of the nodes in S1, also referred to as a target node, the process in S6 to complete a first stage of block execution, adding the minimum read-transaction serial number and the minimum written-transaction serial number of each of the states to auxiliary data, and acquiring a latest version number of each of the states and adding the latest version number of each of the states to the auxiliary data;

S9.2, broadcasting, by the high-performance node, the auxiliary data finally obtained in S9.1 to the network; and in response to other nodes of the nodes having received the auxiliary data, generating, by a scheduler, scheduling data according to the latest version number of each of the states; and S9.3, maintaining, by the high-performance node, a concurrent processing queue; and in response to a state in the concurrent processing queue having completed the last update, scheduling related transactions of the state in the concurrent processing queue in advance, thereby to realize inter-node auxiliary concurrency acceleration.

By the minimum read-transaction serial number and the minimum written-transaction serial number of each of the states obtained by the high-performance node, a first stage of block execution can be completed in advance (that is, the operation described in S6). The first stage of the block execution must be completed in advance, such that intra-block transactions can be scheduled in advance. The second stage of concurrent processing of inter-block transactions is consistent with S7.

In an embodiment, the inter-node auxiliary concurrency acceleration scheme based on DAG dependency graph described in S10 specifically includes:

in the serial execution process, generating, by the high-performance node, a DAG dependency graph between transactions according to a determined sequence of transaction sets; storing, the DAG dependency graph between transactions by using an edgeset array, and modifying a version number of the DAG dependency graph between transactions during updating of state, where the version number of the DAG dependency graph between transactions includes a block height and a transaction serial number; for intra-block transactions and inter-block transactions, constructing DAG dependency graphs respectively to thereby form the auxiliary data, where a version number of the DAG dependency graph of the intra-block transactions does not include a block height;

a construction process of the edgeset array includes:

1) during each transaction of the transactions performing writing for one state of the states, updating a version number of the one state; and in a situation that there is reading or writing of a state corresponding to the one state in a subsequent transaction, that is to say, the subsequent transaction is dependent on the transaction that updated the one state, generating an edge from the subsequent transaction to the transaction that updated the one state;

2) broadcasting, by the high-performance node, the auxiliary data to the network; and in response to the other nodes of the nodes having received the auxiliary data, processing, by the scheduler, the transactions concurrently by using a concurrency algorithm based on DAG dependency graph, including: traversing the edgeset array in the auxiliary data, constructing a dependency relationship between transactions, in response to one transaction of the transactions having a dependent transaction, accumulating a dependency number of the one transaction by 1; in response to the one transaction having been processed, reducing a dependency number of the dependent transaction by 1; in response to the dependency number of the dependent transaction being reduced to 0, processing the dependent transaction; in response to concurrency decreasing through the maintaining, by the node, the concurrent processing queue, connecting, by the scheduler, a DAG dependency graph of a subsequent block with a DAG dependency graph being processed, thereby realizing concurrent processing of the inter-block transactions.

Compared with the related art, the present disclosure provides the asynchronous and concurrent transaction processing method with high-performance oriented to the permissioned blockchain, which has the following beneficial effects.

The present disclosure provides the asynchronous and concurrent transaction processing method with high-performance oriented to the permissioned blockchain, which is based on OEV architecture, and it separates the sequencing stage and the execution stage of transaction processing, and a block producer (BP) does not need to execute the block before initiating consensus. By introducing deterministic concurrency control technology, the validation node does not need to wait for the BP to complete the block execution first. Therefore, the waiting time between nodes is reduced, so that the performance is improved; and the deterministic concurrency control technology introduced by the present disclosure can realize complete concurrency without using locks, so that the system performance is greatly improved. The present disclosure improves the related problems of the deterministic concurrency control technology, and designs a scheme of consensus layer to avoid single point failure, so that the stability is improved while maintaining high performance. The present disclosure also designs an inter-node auxiliary concurrency acceleration scheme, which assists other nodes to improve the transaction processing performance through a high-performance node, thereby reducing the equipment cost required for improving the system performance.

In summary, the present disclosure introduces an efficient deterministic concurrency control technology, which improves the stability of transaction processing performance, and reduces the cost of comprehensive equipment required.

DETAILED DESCRIPTION OF EMBODIMENTS

Technical solutions in an embodiment of the present disclosure will be described clearly and completely hereinafter in combination with accompanying drawings. It is apparently that the described embodiment is merely a part of embodiments of the present disclosure, but not the whole embodiment.

Embodiment 1

Referring to FIGS. 1-8, the present disclosure provides an asynchronous and concurrent transaction processing method with high-performance oriented to a permissioned blockchain, which specifically includes the following steps 1-7.

In the step 1, each of nodes in a network constructs a local hash ring; a position of each of the nodes in the network on the local hash ring of each of the nodes is determined according to a node identifier of each of the nodes; the local hash ring of each of the nodes is updated by each of the nodes when a new node is added into the network, and the new node constructs a complete hash ring.

In the step 2, each of the nodes uses a synchronization clock to synchronize an equipment time; each of the nodes maintains a time wheel timer, and an interval between time slots is 50 milliseconds; in response to a transaction being not packaged into a block in a period more than 3 seconds, a corresponding one node of the nodes accumulates a version number of the transaction by 1, a hash value of each of the nodes is recalculated, and the transaction is distributed by the corresponding one node to other nodes for processing.

Figure 1:
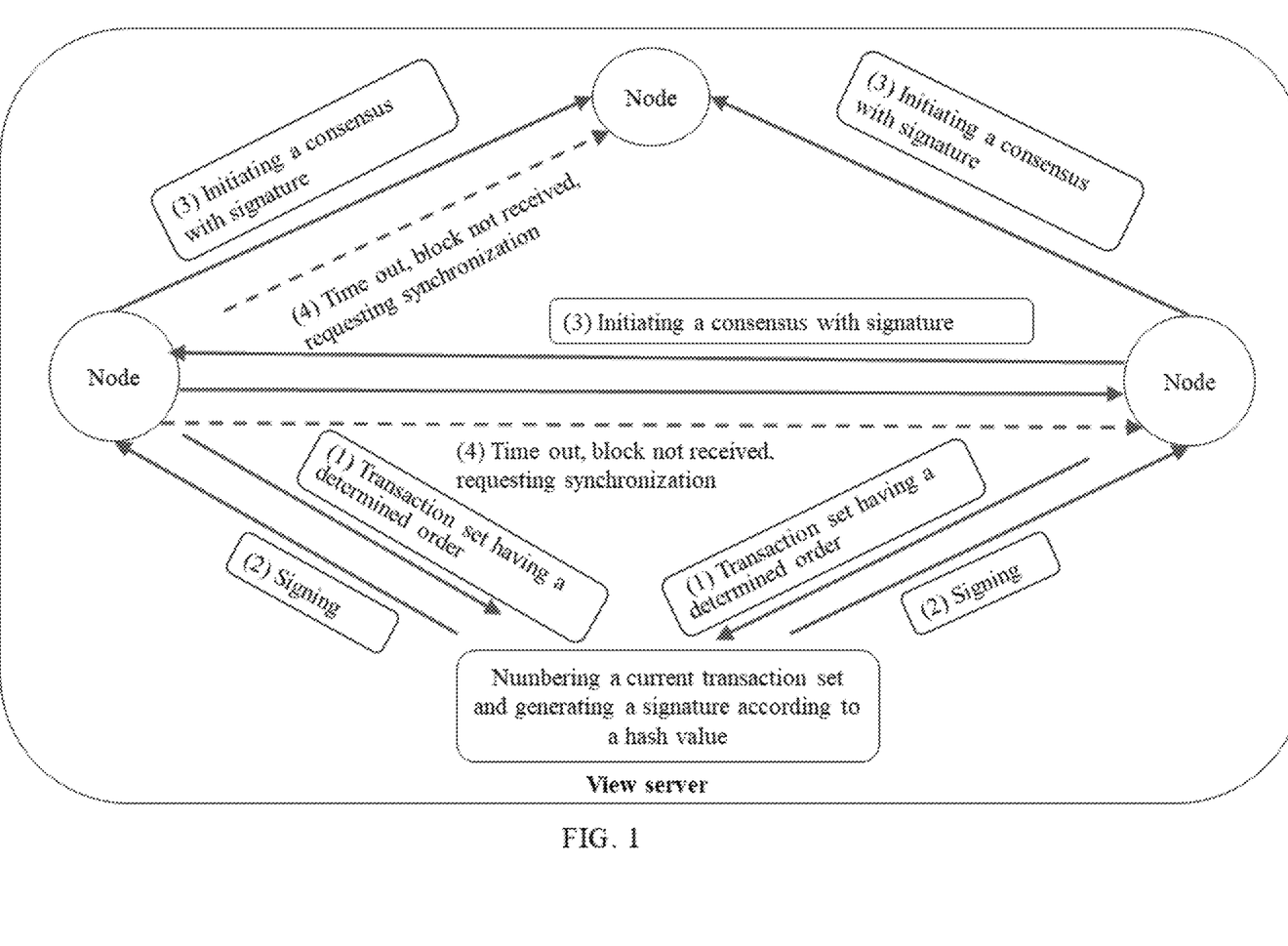
FIG. 1 illustrates a view of an interaction process between a view server and block producers according to an embodiment 1 of the present disclosure.

In the step 3, two nodes, namely, a node A and a node B, are set to generate a block in each consensus round, and a longest time interval of each consensus round is set to 1 second, and a waiting time before consensus is initiated by the nodes generating the block is set to 0.2 seconds. A view number obtained by the node A from a view server is larger than that obtained by the node B from the view server. After waiting for 0.2 seconds, the node A initiates consensus and carries a synchronization message for indicating aborting the node B from initiating consensus in advance. Due to network failure of the node B, when the consensus initiated by the node A is completed, this round of consensus is completed in advance, and it is determined that one block is generated in this round without waiting for the fixed interval of 1 second. An interaction process between nodes initiating consensus and the view server is shown in FIG. 1.

In the step 4, when the consensus is completed on the block, each of the nodes executes the block, and broadcasts a hash of the block after executing to the network, and waits for enough confirmation messages; transactions in a process of executing of the block are processed concurrently based on a deterministic concurrency control technology to obtain a minimum read-transaction serial number and a minimum written-transaction serial number of each of states; in a transaction process and submission stage, the transactions in the block are processed concurrently; and in an independent processing logic of each transaction of the transactions, a reading set and a writing set of the transaction are traversed and compared with the minimum read-transaction serial number and the minimum written-transaction serial number of each of the states to obtain a comparison result; and the transaction is determined to be committed or aborted based on the comparison result, specifically:

1) in response to the minimum written-transaction serial number corresponding to a state in the writing set of the transaction being less than a serial number of the transaction, the transaction is aborted;
2) in a situation that the transaction satisfies one of the following two situations, or the transaction satisfies none of the following two situations, the transaction is submitted directly:
    (1) the minimum read-transaction serial number corresponding to a state in the writing set of the transaction is less than the serial number of the transaction;
    (2) the minimum written-transaction serial number corresponding to a state in the reading set of the transaction is less than the serial number of the transaction;
3) for the transaction that satisfies the two conditions in 2) at the same time, all related transactions of the transaction are obtained, and the all related transactions originate from in a minimum read-transaction serial number set or a minimum written-transaction serial number set of the states, specifically including the following two conditions:
    (1) a serial number of each of the all related transactions is greater than the serial number of the transaction, and the minimum written-transaction serial number corresponding to a state in the reading set of the transaction is greater than the serial number of the transaction;
    (2) a serial number of each of the all related transactions is less than the serial number of the transaction, and the minimum read-transaction serial number corresponding to a state in the writing set of the transaction is less than the serial number of the transaction;
4) in an additional commit stage, transactions satisfying the conditions in 2) are processed concurrently; when all related transactions obtained in 3) of each of the transactions satisfying the conditions in 2) are aborted in advance, each of the transactions satisfying the conditions in 2) is committed at the additional commit stage.

Figure 2:
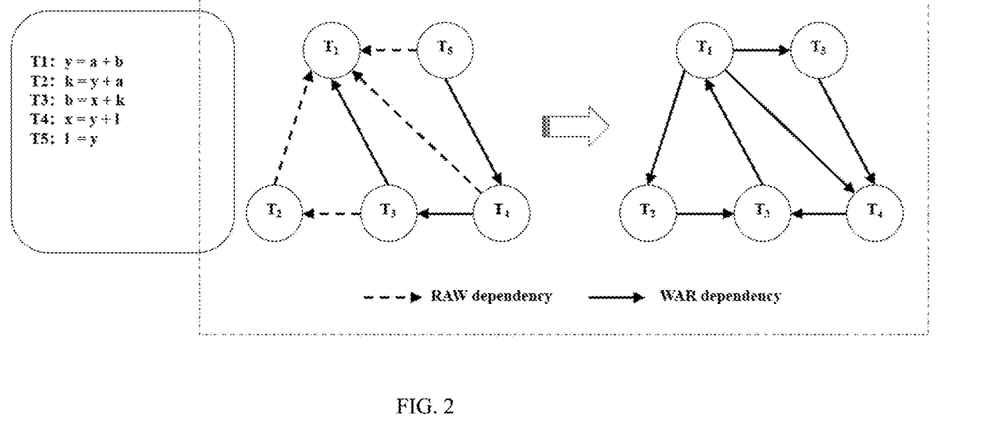
FIG. 2 illustrates an exemplary view of additional submission based on a deterministic concurrency control technology according to the embodiment 1 of the present disclosure.

In a situation that the minimum read-transaction serial number corresponding to a state in the writing set of the transaction is less than the serial number of the transaction, and it is recorded that the transaction has a write after read (WAR) dependency on the minimum read-transaction serial number of this state; and in a situation that the minimum written-transaction serial number corresponding to a state in the reading set of the transaction is less than the serial number of the transaction, and it is recorded that the transaction has a read after write (RAW) dependency on the minimum written-transaction serial number of this state; all RAW dependencies are converted into WAR dependencies, and a directed acyclic graph (DAG) is constructed according to the WAR dependencies. The above related transactions are vertex transactions to which all edges of vertices corresponding to transactions in the DAG point. As shown in FIG. 2, if no additional submission round is added, only transactions T1 and T2 satisfying conditions are submitted. If additional commit rounds are added, because transactions T3 and T4 are marked as aborted, transactions T4 and T5 will be committed due to all related transactions thereof being marked as aborted in the additional commit stage, thereby committing two more transactions and still meeting the requirements of serializability.

In the step 5, according to a ratio of a length of a data conflict chain to a size of the block, a deterministic step-by-step delay block generation method is performed on an abort transaction, to provide a buffer effect for the coordination of consensus modules, specifically:

in response to a length of a data conflict chain of the abort transaction being less than 5% of the size of the block, the abort transaction is put back into a transaction pool, and the abort transaction is submitted after a target number of blocks from the block when the length of the data conflict chain of the abort transaction does not continue to grow;

in response to the length of the data conflict chain of the abort transaction being greater than 5% of the size of the block, a block generation process starts after a different number of blocks from the block, specifically:

(1) in response to the length of the data conflict chain of the abort transaction being greater than 5% of the size of the block and less than or equal to 20% of the size of the block, the block generation process starts from a fifth block after the block;

(2) in response to the length of the data conflict chain of the abort transaction being greater than 20% of the size of the block and less than or equal to 40% of the size of the block, the block generation process starts from a tenth block after the block;

(3) in response to the length of the data conflict chain of the abort transaction being greater than 40% of the size of the block and less than or equal to 60% of the size of the block, the block generation process starts from a fifteenth block after the block;

(4) in response to the length of the data conflict chain of the abort transaction being greater than 60% of the size of the block, the block generation process starts from a twentieth block after the block;

in response to the length of the data conflict chain of the abort transaction being accumulated in multiple blocks, continuing the block generation process backward according to a proportional change.

Figure 3:
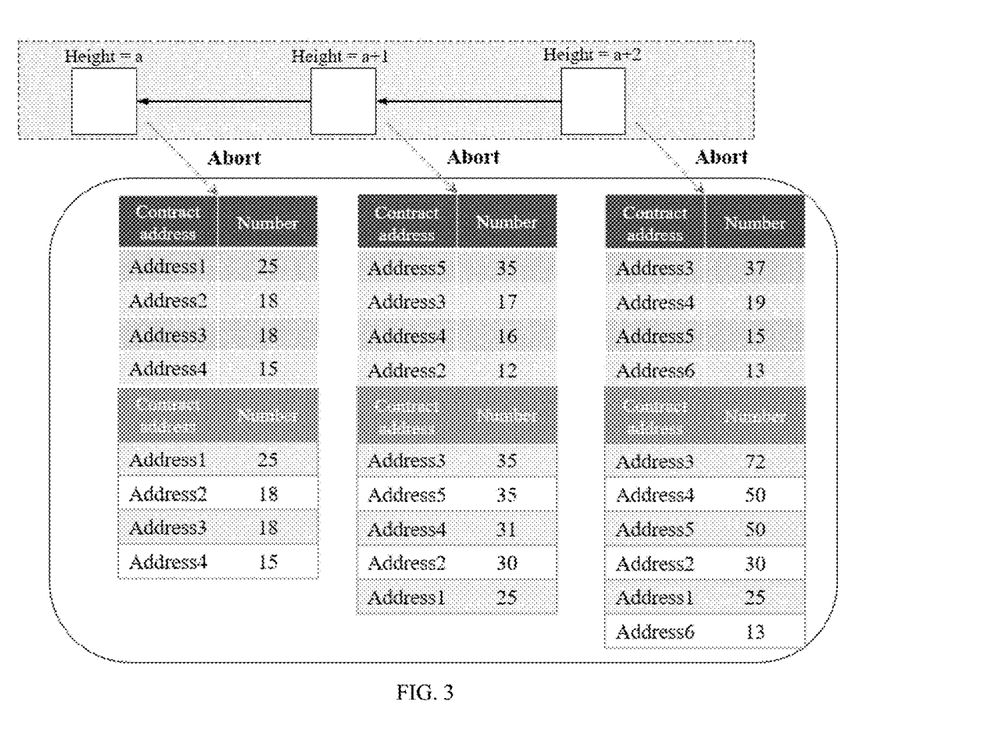
FIG. 3 illustrates a sequencing process view of abort transactions based on a delayed centralized processing scheme according to the embodiment 1 of the present disclosure.

A first threshold of a delayed centralized processing scheme is set fixedly to 10 instead of 5% of the size of the block, and a maximum block interval of abort transactions can be controlled within a reasonable range of about 10 blocks. In order to make delayed transactions form continuous blocks, all delayed transactions are formed into continuous blocks at one time when a transaction set that satisfies conditions appears in a set of the all delayed transactions. Next, a process of ordering is shown through an example. As shown in FIG. 3, the number of transactions with the same contract represents the length of the conflict chain, and the detailed process of insertion ordering is illustrated through an example. In a single block, if there are contracts with the same number of transactions, according to an initial statistical order, the contracts are inserted and ordered in turn, and an original order can be retained after inserting the contracts with the same number of transactions. When an abort transaction with a block height of a+1 is added to a delayed waiting queue, the number of abort transactions of a contract with an address of Address5 is equal to the number of abort transactions of a contract with an address of Address3, but since the Address3 has been added to the delayed waiting queue when the block height is a, the Address5 needs to be inserted after the Address3. When an abort transaction with a block height of a+2 is added to the delayed waiting queue, the number of contracts with an address of Address4 is equal to the number of contracts with an address of Address5. Since the Address4 is added to the delayed waiting queue one block height earlier than the Address5, the Address5 needs to be inserted after the Address4. It should be noted that, assuming that both the Address4 and the Address5 are added to the delayed waiting queue for the first time when the block height is a+1, the insertion order will be done in turn according to the sequence in the delay queue, the Address4 will be reinserted after the Address5 because it was originally arranged after the Address5, and finally the Address4 will be inserted after the Address5.

Figure 4:
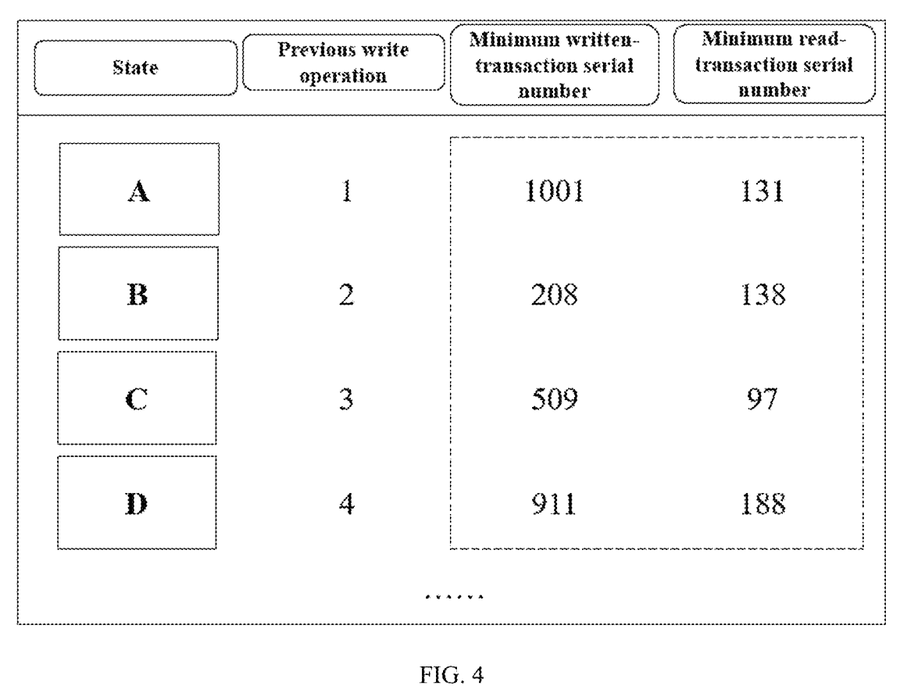
FIG. 4 illustrates a structure view of auxiliary data for concurrency acceleration based on the deterministic concurrency control technology according to the embodiment 1 of the present disclosure.
Figure 5:
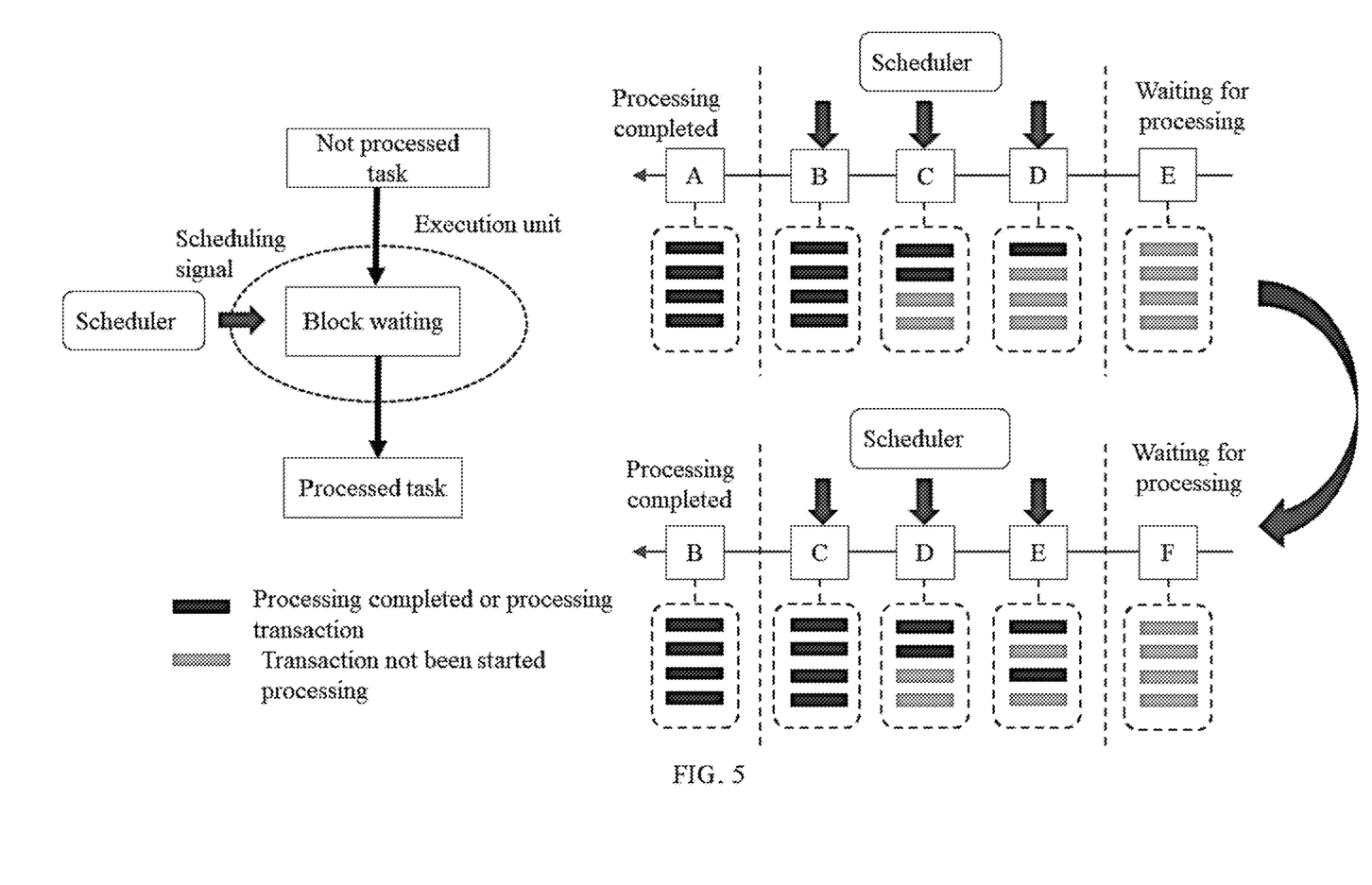
FIG. 5 illustrates a process view of inter-block transaction concurrency based on the deterministic concurrency control technology according to the embodiment 1 of the present disclosure.

In the step 6, a high-performance node generates auxiliary data, a length of a concurrent queue is set to 10, and a last updated version number of each of the states is recorded as a relative distance between blocks. A structure of the auxiliary data is shown in FIG. 4. Other nodes realize concurrency acceleration of inter-block transactions through the auxiliary data, and a process view is shown in FIG. 5.

Figure 6:
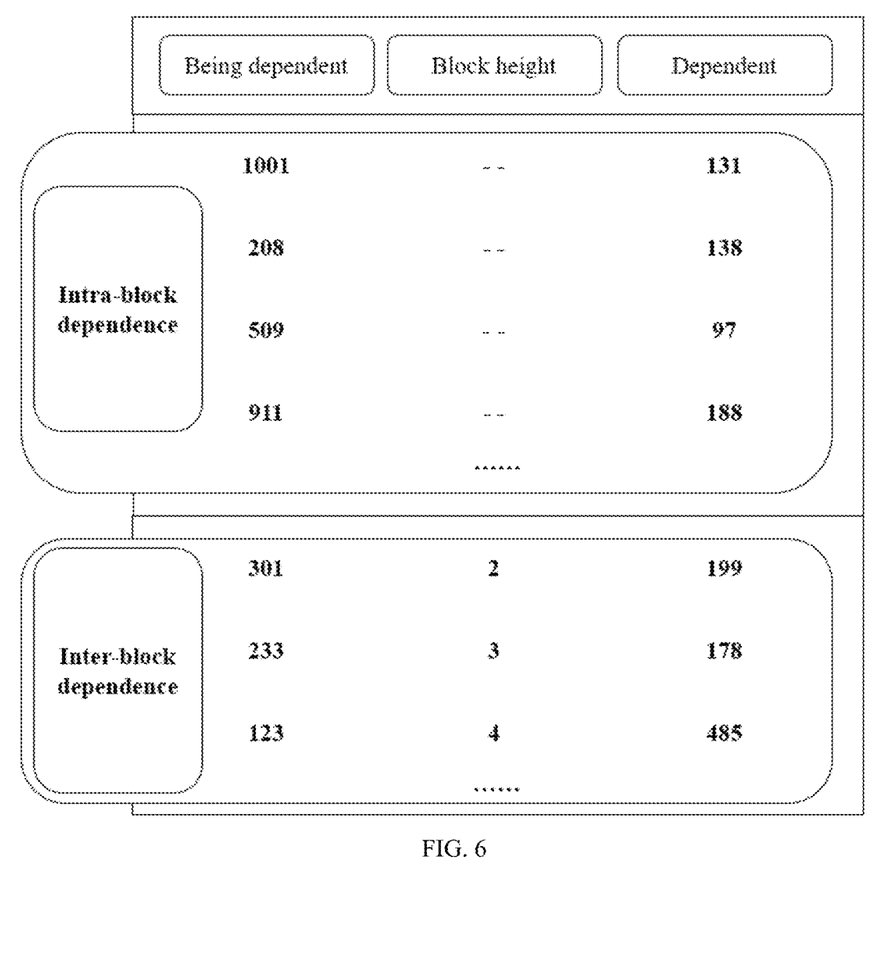
FIG. 6 illustrates a structure view of auxiliary data for concurrency acceleration based on the delayed centralized processing scheme according to the embodiment 1 of the present disclosure.
Figure 7:
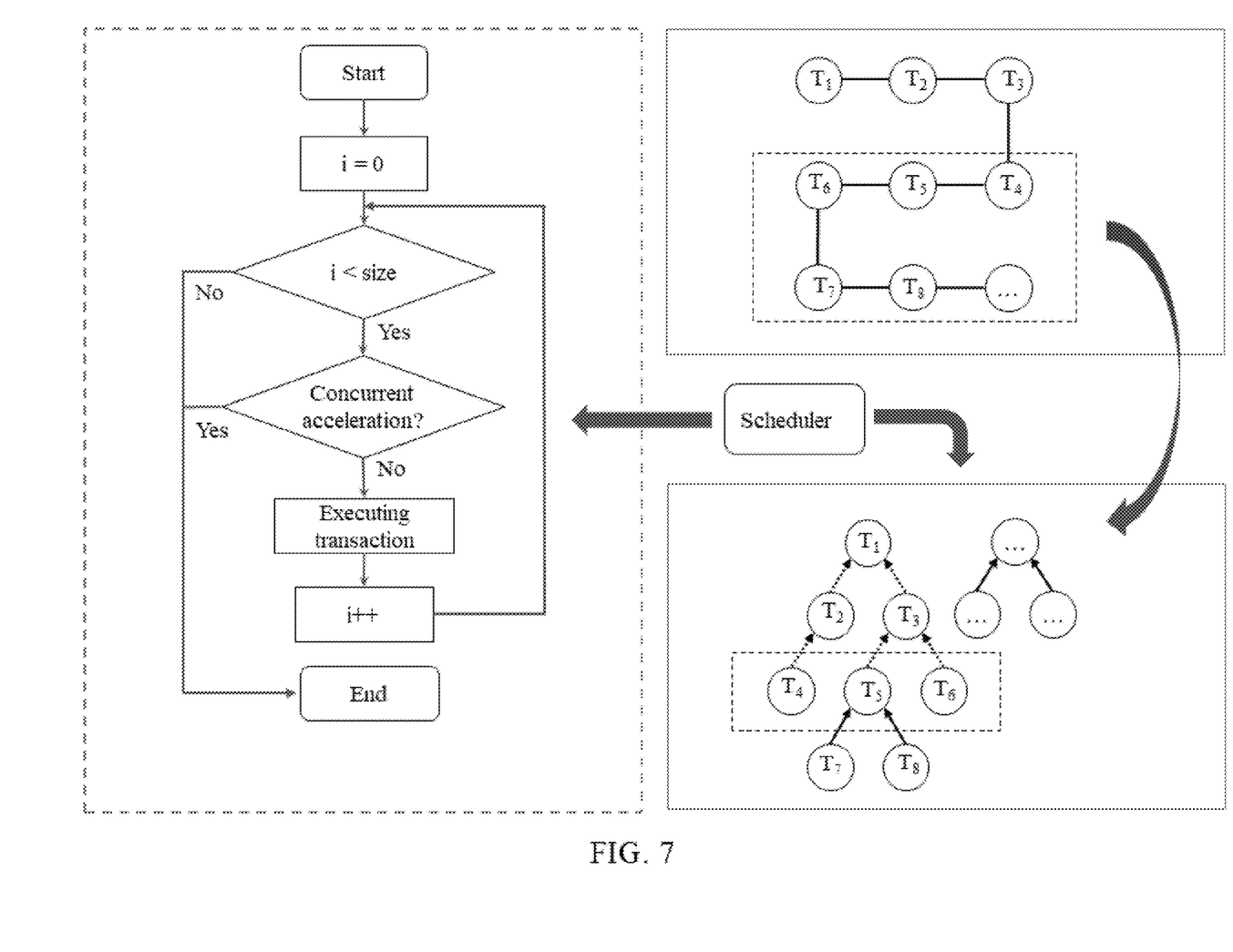
FIG. 7 illustrates a process view of serial-to-concurrent conversion based on the delayed centralized processing scheme according to the embodiment 1 of the present disclosure.
Figure 8:
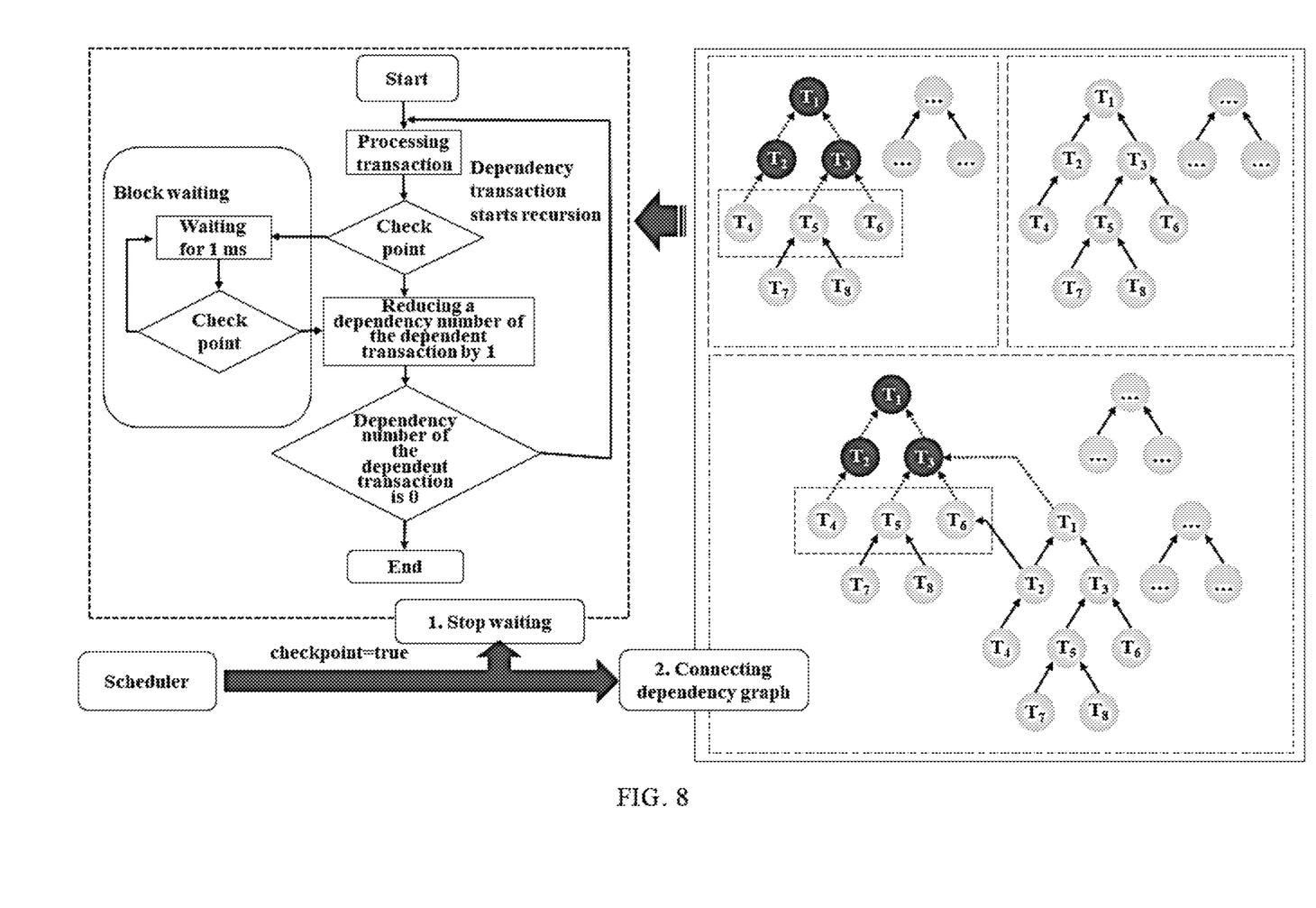
FIG. 8 illustrates a process view of inter-block transaction concurrency based on the delayed centralized processing scheme according to the embodiment 1 of the present disclosure.

In the step 7, based on a delayed centralized processing scheme, a high-performance node generates auxiliary data, a length of a concurrent queue is set to 10, and a structure view of the auxiliary data is as shown in FIG. 6; when the other nodes receive the auxiliary data while executing the block in series, the other nodes can change serial execution into a concurrency acceleration state, as shown in FIG. 7; the number of transactions being processed is monitored, when the number of transactions being processed is less than the number of CPU cores, it means that the degree of concurrency is lower, and a process of inter-block transaction concurrency can be realized by connecting DAG dependency graph. A process view of inter-block transaction concurrency is shown in FIG. 8.

The above is merely the exemplary embodiment of the present disclosure, but the scope of protection of the present disclosure is not limited thereto. Any person familiar with the technical field who makes equivalent substitution or change according to the technical solutions and inventive concept of the present disclosure within the technical scope disclosed by the present disclosure should be included in the scope of protection of the present disclosure.

What is claimed is:

1. An asynchronous and concurrent transaction processing method with high-performance oriented to a permissioned blockchain, comprising:
   S1, constructing, by nodes in a network, a local hash ring of each of the nodes, determining a position of each of the nodes in the network on the local hash ring of each of the nodes according to a node identifier of each of the nodes; updating, by each of the nodes, the local hash ring of each of the nodes when a new node is added into the network, and constructing, by the new node, a complete hash ring;
   S2, using, by each of the nodes, a synchronization clock to synchronize an equipment time;
   maintaining, by each of the nodes, a time wheel timer with a time complexity of O(n); monitoring a delay of a transaction according to a timestamp of the transaction; in response to the delay reaching a preset threshold, increasing a version number of the transaction by 1, and redistributing a node for processing the transaction through re-hashing;
   S3, based on a round robin mechanism of blockchain consensus, generating, by the nodes, blocks alternately and asynchronously and initiating consensus in a round, and finally confirming the blocks at the end of the round;
   S4, in a situation that the blocks are generated by the nodes asynchronously in the round, obtaining different transaction sets by using a consistent hash algorithm, generating the blocks according to the different transaction sets; managing, by a view server, heights of the blocks; before the nodes initiate the consensus, initiating, by the nodes, consensus requests to the view server, signing, by the view server, view codes, and sending, by the nodes, the blocks containing the view codes to the network for consensus;

S5, in a situation that the nodes in the network reach the consensus on the blocks, that is, a total number of the nodes is N, a total number of Byzantine nodes is f, N≥3f+1, and more than 2f+1 acknowledgments are received by the nodes, thus it is determined that the nodes have reached the consensus on the blocks, determining an order of transactions in the blocks;

S6, in a situation that the consensus is completed on the blocks, executing, by each of the nodes, the blocks, and broadcasting a hash of each of the executed blocks to the network, and waiting for target number of confirmation messages; concurrently processing the transactions in an execution process of the blocks based on a deterministic concurrency control technology to obtain a minimum read-transaction serial number and a minimum written-transaction serial number of each of states;

S7, in a process and submission stage of the transactions, processing the transactions in the blocks concurrently; and in an independent processing logic of each transaction of the transactions, traversing a reading set and a writing set of the transaction; comparing the reading set and the writing set of the transaction with the minimum read-transaction serial number and the minimum written-transaction serial number of each of the states obtained in S6, to thereby determine whether to commit or abort the transactions to thereby obtain an abort transaction of the transactions;

S8, designing a delayed centralized processing scheme for the abort transaction obtained in S7, and performing a deterministic step-by-step delayed block generation method on the abort transaction according to a ratio of a length of a data conflict chain of the abort transaction to a size of a block of the abort transaction, to provide a buffer effect for the coordination of consensus modules;

S9, for a complete block execution process in S6 and S7, designing an inter-node auxiliary concurrency acceleration scheme;

wherein inter-node auxiliary concurrency acceleration scheme specifically comprises:

S9.1, executing, by a high-performance node of the nodes, the process in S6 to complete a first stage of block execution, adding the minimum read-transaction serial number and the minimum written-transaction serial number of each of the states to auxiliary data, and acquiring a latest version number of each of the states and adding the latest version number of each of the states to the auxiliary data;

S9.2, broadcasting, by the high-performance node, the auxiliary data finally obtained in S9.1 to the network; and in response to other nodes of the nodes having received the auxiliary data, generating, by a scheduler, scheduling data according to the latest version number of each of the states; and S9.3, maintaining, by the high-performance node, a concurrent processing queue; and in response to a state in the concurrent processing queue having completed the last update, scheduling related transactions of the state in the concurrent processing queue in advance, thereby to realize inter-node auxiliary concurrency acceleration; and S10, for a serial execution process in the delayed centralized processing scheme, designing an inter-node auxiliary concurrency acceleration scheme based on directed acyclic graph (DAG) dependency graph;

wherein the inter-node auxiliary concurrency acceleration scheme based on DAG dependency graph specifically comprises:

in the serial execution process, generating, by the high-performance node, a DAG dependency graph between transactions according to a determined sequence of transaction sets; storing, the DAG dependency graph between transactions by using an edgeset array, and modifying a version number of the DAG dependency graph between transactions during updating of state, wherein the version number of the DAG dependency graph between transactions comprises a block height and a transaction serial number; for intra-block transactions and inter-block transactions, constructing DAG dependency graphs respectively to thereby form the auxiliary data, wherein a version number of the DAG dependency graph of the intra-block transactions does not comprise a block height;

wherein a construction process of the edgeset array comprises:

1) During each transaction of the transactions performing writing for one state of the states, updating a version number of the one state; and in a situation that there is reading or writing of a state corresponding to the one state in a subsequent transaction, that is to say, the subsequent transaction is dependent on the transaction that updated the one state, generating an edge from the subsequent transaction to the transaction that updated the one state;

2) Broadcasting, by the high-performance node, the auxiliary data to the network; and in response to the other nodes of the nodes having received the auxiliary data, processing, by the scheduler, the transactions concurrently by using a concurrency algorithm based on DAG dependency graph, comprising: traversing the edgeset array in the auxiliary data, constructing a dependency relationship between transactions, in response to one transaction of the transactions having a dependent transaction, accumulating a dependency number of the one transaction by 1; in response to the one transaction having been processed, reducing a dependency number of the dependent transaction by 1; in response to the dependency number of the dependent transaction being reduced to 0, processing the dependent transaction; in response to concurrency decreasing through the maintaining, by the node, the concurrent processing queue, connecting, by the scheduler, a DAG dependency graph of a subsequent block with a DAG dependency graph being processed, thereby realizing concurrent processing of the inter-block transactions.

2. The asynchronous and concurrent transaction processing method with high-performance oriented to the permissioned blockchain as claimed in claim 1, wherein in S4, in a situation that there is an interval in view codes acquired by one node of the nodes, the one node waits for a period of t; in response to the one node initiating the consensus having not received information within the period of t, it is considered that a node acquiring a smaller view code than that acquired by the one node has not initiated consensus normally, and the one node initiating the consensus makes synchronization information indicating aborting in advance be contained in the consensus request of the one node, and the nodes reach a consensus on a block whose interval is aborted in advance; in response to the one node initiating the consensus having not received the information due to network failure thereof and other nodes having completed a consensus request with the smaller view code, the one node initiating the consensus is recognized by each of the other nodes having completed the consensus request with the smaller view code, aborting the consensus initiated by the one node in advance.

3. The asynchronous and concurrent transaction processing method with high-performance oriented to the permissioned blockchain as claimed in claim 1, wherein S7 further comprises:
 1) In response to the minimum written-transaction serial number corresponding to a state in the writing set of the transaction being less than a serial number of the transaction, aborting the transaction;
 2) In a situation that the transaction satisfies one of the following two situations, or the transaction satisfies none of the following two situations submitting the transaction directly:
  (1) the minimum read-transaction serial number corresponding to a state in the writing set of the transaction is less than the serial number of the transaction;
  (2) the minimum written-transaction serial number corresponding to a state in the reading set of the transaction is less than the serial number of the transaction;
 3) For the transaction that satisfies the two conditions in 2) at the same time, obtaining all related transactions of the transaction, wherein the all related transactions originate from in a minimum read-transaction serial number set or a minimum written-transaction serial number set of the states, the all related transactions of the transaction satisfy one of the following two conditions:
  (1) a serial number of each of the all related transactions is greater than the serial number of the transaction, and the minimum written-transaction serial number corresponding to a state in the reading set of the transaction is greater than the serial number of the transaction;
  (2) a serial number of each of the all related transactions is less than the serial number of the transaction, and the minimum read-transaction serial number corresponding to a state in the writing set of the transaction is less than the serial number of the transaction;
 4) In an additional commit stage, processing transactions satisfying the two conditions in 2) concurrently; and in response to all related transactions obtained in 3) of each of the transactions satisfying the two conditions in 2) having been aborted in advance, committing each of the transactions satisfying the two conditions in 2) at the additional commit stage.

4. The asynchronous and concurrent transaction processing method with high-performance oriented to the permissioned blockchain as claimed in claim 1, wherein the delayed centralized processing scheme in S8 specifically comprises:
 in response to the length of the data conflict chain of the abort transaction being less than 5% of the size of the block of the abort transaction, putting the abort transaction back into a transaction pool, and submitting the abort transaction after a target number of blocks from the block of the abort transaction when the length of the data conflict chain of the abort transaction does not continue to grow;
 in response to the length of the data conflict chain of the abort transaction being greater than 5% of the size of the block of the abort transaction, starting a block generation process after different number of blocks from the block of the abort transaction, specifically comprising:
  (1) in response to the length of the data conflict chain of the abort transaction being greater than 5% of the size of the block of the abort transaction and less than or equal to 20% of the size of the block of the abort transaction, starting the block generation process from a fifth block after the block of the abort transaction;
  (2) in response to the length of the data conflict chain of the abort transaction being greater than 20% of the size of the block of the abort transaction and less than or equal to 40% of the of the abort transaction, starting the block generation process from a tenth block after the block of the abort transaction;
  (3) in response to the length of the data conflict chain of the abort transaction being greater than 40% of the size of the block of the abort transaction and less than or equal to 60% of the size of the block of the abort transaction, starting the block generation process from a fifteenth block after the block of the abort transaction;
  (4) in response to the length of the data conflict chain of the abort transaction being greater than 60% of the size of the block of the abort transaction, starting the block generation process from a twentieth block after the block of the abort transaction;
 in response to the length of the data conflict chain of the abort transaction being accumulated in multiple blocks, continuing the block generation process backward according to a proportional change.

* * * * *